US012534339B2

(12) United States Patent
Pu et al.

(10) Patent No.: US 12,534,339 B2
(45) Date of Patent: Jan. 27, 2026

(54) ELEVATOR MONITORING SYSTEM

(71) Applicant: KONE CORPORATION, Helsinki (FI)

(72) Inventors: Chengdong Pu, Kunshan (CN); Tao Ye, Kunshan (CN); Jiao Li, Kunshan (CN)

(73) Assignee: KONE CORPORATION, Helsinki (FI)

( * ) Notice: Subject to any disclaimer, the term of this patent is extended or adjusted under 35 U.S.C. 154(b) by 1395 days.

(21) Appl. No.: 17/167,696

(22) Filed: Feb. 4, 2021

(65) Prior Publication Data

US 2021/0261383 A1 Aug. 26, 2021

(30) Foreign Application Priority Data

Feb. 25, 2020 (CN) ......................... 202010115143.2

(51) Int. Cl.
*B66B 5/00* (2006.01)
*B66B 1/34* (2006.01)
*B66B 3/00* (2006.01)

(52) U.S. Cl.
CPC .......... *B66B 5/0012* (2013.01); *B66B 1/3461* (2013.01); *B66B 1/3476* (2013.01); *B66B 3/00* (2013.01); *B66B 5/0018* (2013.01)

(58) Field of Classification Search
CPC ... B66B 5/0012; B66B 1/3461; B66B 1/3476; B66B 3/00; B66B 5/0018
USPC .......................................................... 187/390
See application file for complete search history.

(56) References Cited

U.S. PATENT DOCUMENTS

2020/0039785 A1* 2/2020 Natarajan ............. B66B 5/0087
2020/0307953 A1* 10/2020 Pahlke ................. B66B 5/0012

* cited by examiner

*Primary Examiner* — Kawing Chan
(74) *Attorney, Agent, or Firm* — Birch, Stewart, Kolasch & Birch, LLP

(57) ABSTRACT

Provided is an elevator monitoring system, including a gateway device, a load weighing device and an elevator controller; the elevator controller is configured to collect status information of an elevator car and fault information when an elevator fails; the gateway device is configured to obtain fault information and status information from the elevator controller; the load weighing device monitors current load value of the elevator car in real time and transmits the current load value to the gateway device; the gateway device calculates a minimum reference load value corresponding to each stopping floor level of the elevator car based on the current load value, updates and records the minimum reference load value in real time; based on the fault information and the status information, if the gateway device determines that the current load value is greater than the minimum reference load value, the gateway device will send a warning alarm.

11 Claims, 3 Drawing Sheets

ELEVATOR MONITORING SYSTEM

TECHNICAL FIELD

The present disclosure relates to an elevator monitoring system, in particular to an elevator monitoring system with self-learning ability.

BACKGROUND

Entrapment of passengers in an elevator car of an elevator is one of key concerns in elevator failure cases, since it will bring direct poor experiences to passengers. In addition, monitoring whether an elevator traps a passenger in an elevator car is also one of key expectations of the government and customers for elevator remote monitoring systems.

Existing monitoring methods include installing cameras or using infrared-based personnel detection sensors to carry out detection. Installing additional sensors will increase costs and bring additional sensor maintenance work. These additional sensors themselves cannot identify a fault state of the elevator. Usually, an additional positioning sensor is needed to detect position of an elevator car to identify whether a passenger is entrapped in the car or the elevator is in a normal passenger-carrying state. In general, all these additional sensors and other measures bring complexity and reduce accuracy of detection.

There is prior art in which a load weighing device is used to detect whether a passenger is in an elevator car. A load weighing device is in general a standard component of every elevator. However, due to the weight of ropes or due to interior decoration of the car, weighing value obtained by such load weighing device is not accurate enough for directly tell whether there is a passenger in the car or how many passengers there are.

It should be noted that there are actually two types of load weighing devices. The first type is a device with a strain gauge at a rope fixing position. The second type is a Hall type device below the elevator car. The first type is sensitive both to the weight of the ropes and the interior decoration of the car. The influence of the weight of ropes on the load weighing value varies according to different floors. For the second type of weighing device below the elevator car, disturbance comes from the interior decoration of the car. The interior decoration of the car can be added at a later time or removed at another time.

It should also be noted that the load weighing value may be affected by inertia effects during operation, acceleration and deceleration. All these uncertainties lead to unreliable detection of only using the load weighing value obtained by the load weighing device.

In addition, there are many local government requirements requiring passenger entrapment must be reported to government platform and needs to be solved in short time. This brings challenges for elevator maintenance on how to accurately and fast identify and solve the entrapment. However, there is no corresponding solution in the prior art.

SUMMARY

In order to solve one or more problems in the prior art, according to one aspect of the present disclosure, an elevator monitoring system is provided. The elevator monitoring system includes a gateway device, a load weighing device, and an elevator controller.

The elevator controller is configured to collect status information of an elevator car and fault information when an elevator fails.

The gateway device is configured to obtain the fault information and the status information from the elevator controller.

The load weighing device monitors the current load value of the elevator car in real time and transmits the current load value to the gateway device.

The gateway device calculates a minimum reference load value corresponding to each stopping floor level of the elevator car based on the obtained current load value, and updates and records the minimum reference load value in the gateway device in real time.

Based on the fault information and the status information, if the gateway device determines that the current load value is greater than the minimum reference load value, the gateway device will send a warning alarm indicating a passenger is entrapped in the elevator car to a remote server.

According to the above aspects of the present disclosure, the status information includes information about a floor level where the elevator car is stopped, information about door zone status of the floor level where the elevator car is stopped, information about the speed of the elevator car, and information about opening and closing of the door of the elevator car.

The status information also includes information about current service mode, which includes a fire protection mode, and a maintenance mode in which a warning alarm will not be issued.

According to the above aspects of the present disclosure, the gateway device is configured to obtain the floor level information, the information about the door zone status of the floor level, the information about the speed of the elevator car and the information about the opening and closing of the door of the elevator car from the elevator controller.

According to the above aspects of the present disclosure, based on the current load value, the information about the door zone status of the floor level and the information about the speed of the elevator car, if the gateway device determines that the current load value is between a minimum safety threshold of the elevator and a maximum safety threshold of the elevator, and the elevator car is within the door zone of the current floor level and the information about the speed is zero, the gateway device records the information about the current floor level therein.

According to the above aspects of the present disclosure, after the gateway device records the current floor level information therein, if the gateway device determines again that the current load value is still between the minimum safety threshold of the elevator and the maximum safety threshold of the elevator, and the elevator car is still within the door zone of the current floor level and the information about the speed of the elevator car is still zero, and furthermore, if the information about the floor level obtained for successive two times is the same (this means that the elevator car has not moved and stopped within the door zone of the same floor level), the gateway device records the current load value corresponding to the information about the current floor level therein.

According to the above aspects of the present disclosure, if the gateway device determines that the recorded current load value corresponding to the information about the current floor level is obtained for the first time, the gateway device uses the current load value as the minimum reference load value corresponding to the information about the current floor level.

According to the above aspects of the present disclosure, if the gateway device determines that the recorded current load value corresponding to the information about the current floor level is not obtained for the first time, the gateway device continues to determine whether the current load value is less than the minimum reference load value corresponding to the information about the current floor level.

If the current load value is less than the minimum reference load value corresponding to the information about the current floor level, the gateway device updates and records the current load value as the minimum reference load value corresponding to the information about the current floor level therein.

If the current load value is greater than the minimum reference load value corresponding to the information about the current floor level, the minimum reference load value corresponding to the information about the current floor level will not be replaced by the current load value.

According to the above aspects of the present disclosure, the gateway device is arranged in an elevator machine room of the elevator system, and the load weighing device and the elevator controller are arranged on the elevator car.

According to the above aspects of the present disclosure, the gateway device uses wireless communication to transmit the warning alarm that indicates a passenger is entrapped in the elevator car to the remote server.

According to the above aspects of the present disclosure, based on the fault information and the status information, if the gateway device determines that the elevator car is not within the door zone of the current floor level, the current load value is compared with the minimum reference load values corresponding to two adjacent stopping floor levels respectively, and if the current load value is greater than both of the minimum reference load values corresponding to the two adjacent stopping floor levels, the gateway device will send the warning alarm indicating a passenger is entrapped in the elevator car to the remote server.

According to the above aspects of the present disclosure, based on the fault information and the status information, if the gateway device determines that the elevator car is within the door area of the current floor level, the current load value is compared with the minimum reference load value corresponding to the current floor level, and if the current load value is greater than the minimum reference load value corresponding to the current floor level, the gateway device will send the warning alarm indicating a passenger is entrapped in the elevator car to the remote server.

Compared with the prior art, the elevator monitoring system according to the present disclosure detects whether there is a passenger inside the elevator car by learning actual load value condition in a no-load state (that is, the determination of the minimum reference load value corresponding to the information about the current floor level), eliminating influences of other components on the load value output, and ensuring robustness of the system.

The elevator monitoring system according to the present disclosure utilizes wireless communication technologies, such as 3G, 4G and 5G. Once it is determined that a passenger is entrapped in the elevator car when the elevator fails, the system will send the warning alarm to the remote server and notify maintenance personnel.

The elevator monitoring system according to the present disclosure can continuously monitor changes in load conditions in real time, and even when the structure of the elevator car or elevator conditions change, the no-load condition (i.e., the minimum reference load value) can be updated quickly to reflect the actual no-load output.

So far, in order for the detailed description of the present disclosure to be better understood, and for the contribution of the present disclosure to the prior art to be better recognized, the present disclosure has been summarized in its content quite extensively. Of course, embodiments of the present disclosure will be described below and will form the subject matter of the appended claims.

Likewise, those skilled in the art will recognize that the concept on which the present disclosure is based can be easily used as a basis for designing other structures, methods, and systems for implementing several purposes of the present disclosure. Therefore, it is important that the appended claims should be considered to include such equivalent structures as long as they do not exceed the spirit and scope of the present disclosure.

BRIEF DESCRIPTION OF THE DRAWINGS

Through the following drawings, those skilled in the art will have a better understanding of the present disclosure, and can more clearly embody the advantages of the present disclosure. The drawings described here are only for illustrative purposes of selected embodiments rather than all possible implementations and are not intended to limit the scope of the present disclosure.

DETAILED DESCRIPTION OF THE PREFERRED EMBODIMENTS

The foregoing and other technical content, features and effects of the present disclosure will be clearly presented in the following detailed description of the embodiments with reference to the accompanying drawings.

Figure 1:
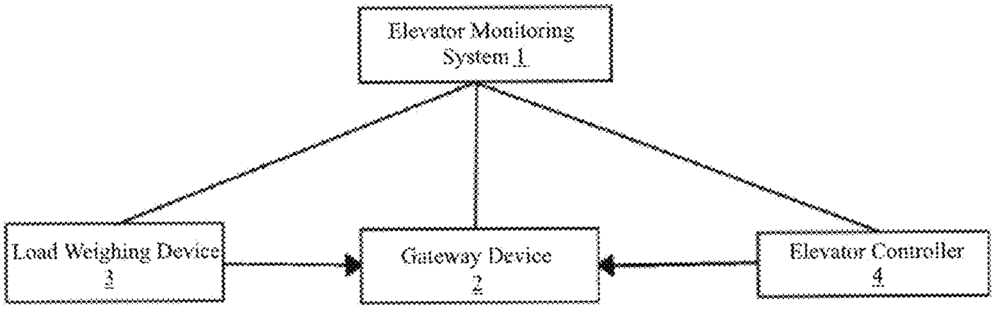
FIG. 1 shows an elevator monitoring system according to the present disclosure.

As shown in FIG. 1, an elevator monitoring system 1 according to an embodiment of the present disclosure is shown. The elevator monitoring system 1 includes a gateway device 2, a load weighing device 3 and an elevator controller 4.

The elevator controller 4 is configured to collect status information of an elevator car and fault information when an elevator fails.

The gateway device 2 is configured to obtain the fault information and the status information from the elevator controller 4.

The load weighing device 3 monitors the current load value of the elevator car in real time and transmits the current load value to the gateway device 2.

The gateway device 2 calculates a minimum reference load value corresponding to each stopping floor level of the elevator car based on the obtained current load value, and updates and records the minimum reference load value in the gateway device 2 in real time.

Figure 2:
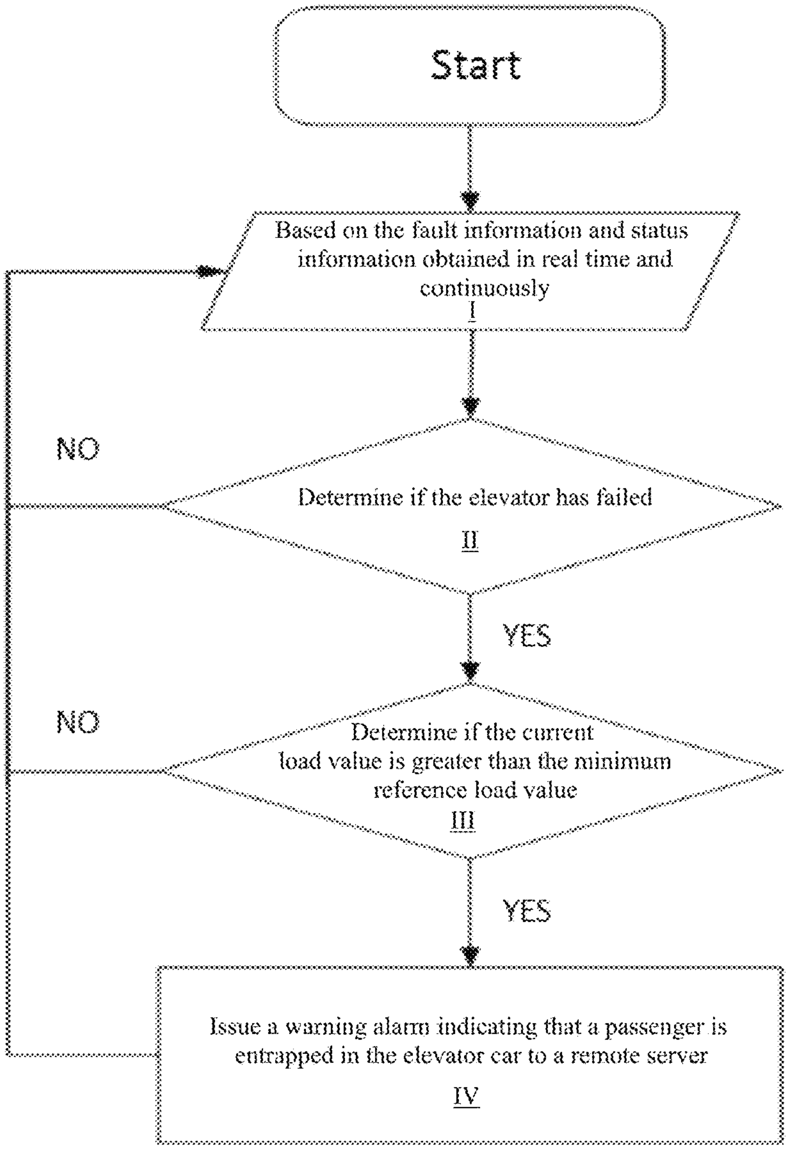
FIG. 2 shows a monitoring flow chart of the elevator monitoring system according to the present disclosure.

As shown in FIG. 2, based on the fault information and status information obtained by the gateway device 2 in real time and continuously (step I), if the gateway device 2 determines that the elevator has failed (step II), and next if the gateway device 2 continues to determine that the current load value is greater than the minimum reference load value (step III), the gateway device 2 will issue a warning alarm indicating that a passenger is entrapped in the elevator car to a remote server (not shown) (Step IV).

For example, if on a certain floor level, the gateway device 2 determines that the elevator has failed on that floor level (for example, but not limited to the case in which the elevator car door is not open), the gateway device 2 will continue to determine whether the load value of the current floor level monitored by the load weighing device 3 in real time is greater than the minimum load value corresponding to this floor level, and if the result is 'YES', it means that a passenger is entrapped in the elevator car.

According to the above embodiment of the present disclosure, the status information includes information about a floor level where the elevator car is stopped, information about door zone status of the floor level where the elevator car is stopped, information about the speed of the elevator car, and information about opening and closing of the door of the elevator car. The status information also includes information about current service mode, which includes a fire protection mode, and a maintenance mode in which a warning alarm will not be issued.

According to the above embodiments of the present disclosure, the gateway device is configured to obtain the floor level information, the information about the door zone status of the floor level, the information about the speed of the elevator car and the information about the opening and closing of the door of the elevator car from the elevator controller.

Figure 3:
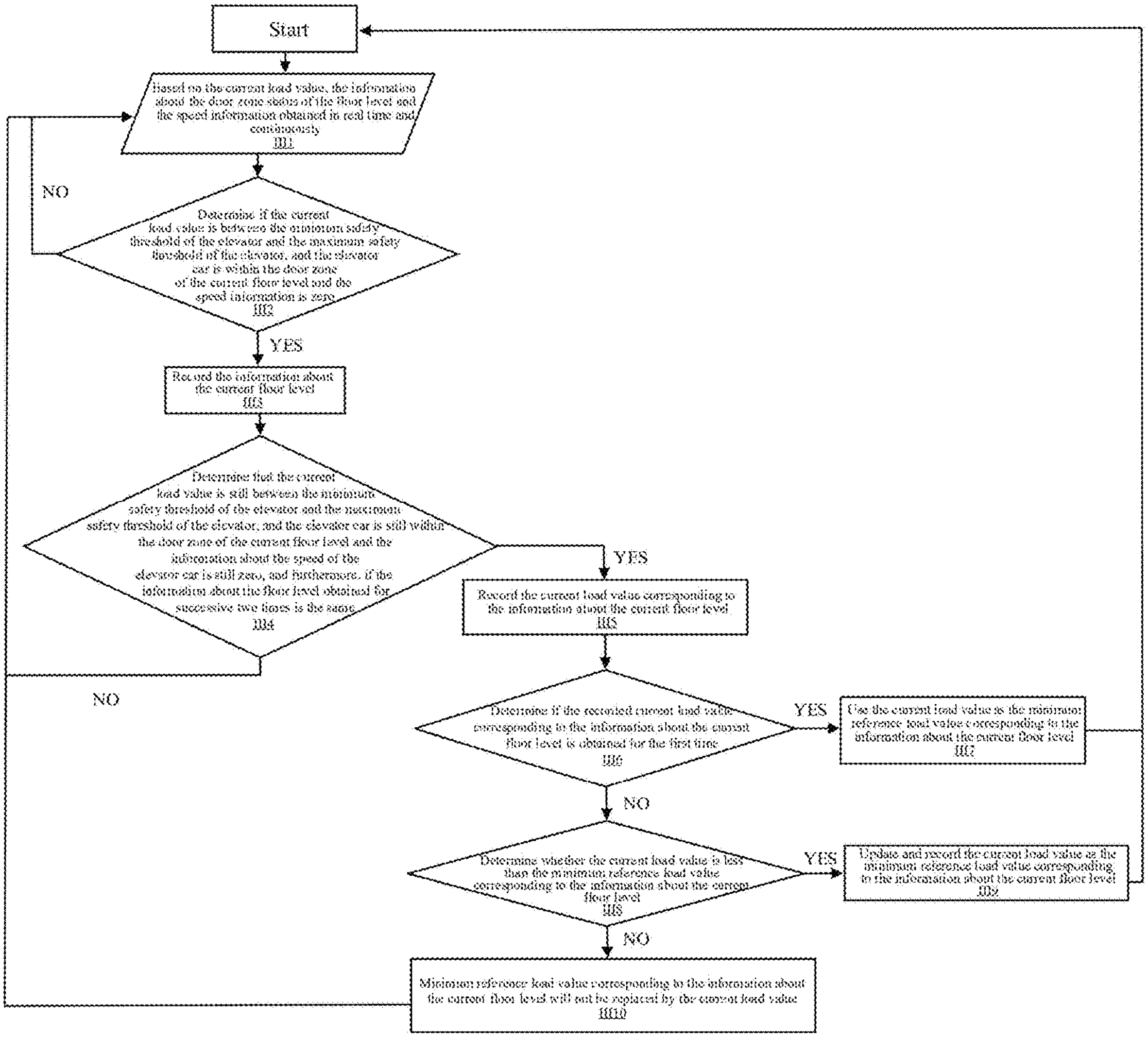
FIG. 3 shows a flowchart for determining the minimum reference load value corresponding to the information about each floor level of the elevator monitoring system according to the present disclosure.

According to the above embodiments of the present disclosure, as shown in FIG. 3, in which the flow chart for determining the minimum reference load value corresponding to each floor level information using the elevator monitoring system according to the present disclosure is shown, based on the current load value, the information about the door zone status of the floor level and the speed information obtained by the gateway device 2 in real time and continuously (step III1), if the gateway device 2 determines that the current load value is between the minimum safety threshold of the elevator and the maximum safety threshold of the elevator, and the elevator car is within the door zone of the current floor level and the speed information is zero (step III2), the gateway device 2 records the information about the current floor level therein (step III3).

According to the above embodiments of the present disclosure, after the gateway device 2 records the current floor level information therein, if the gateway device 2 determines again that the current load value is still between the minimum safety threshold of the elevator and the maximum safety threshold of the elevator, and the elevator car is still within the door zone of the current floor level and the information about the speed of the elevator car is still zero, and furthermore, if the information about the floor level obtained for successive two times is the same (step III4), the gateway device 2 records the current load value corresponding to the information about the current floor level therein (step III5).

According to the above embodiments of the present disclosure, if the gateway device 2 determines that the recorded current load value corresponding to the information about the current floor level is obtained for the first time (step III6), the gateway device 2 uses the current load value as the minimum reference load value corresponding to the information about the current floor level (step III7).

According to the above embodiments of the present disclosure, if the gateway device 2 determines that the recorded current load value corresponding to the information about the current floor level is not obtained for the first time, the gateway device 2 continues to determine whether the current load value is less than the minimum reference load value corresponding to the information about the current floor level (step III8).

If the current load value is less than the minimum reference load value corresponding to the information about the current floor level, the gateway device 2 updates and records the current load value as the minimum reference load value corresponding to the information about the current floor level therein (step III9).

If the current load value is greater than the minimum reference load value corresponding to the information about the current floor level, the minimum reference load value corresponding to the information about the current floor level will not be replaced by the current load value (step III10).

According to the above steps III1 to III10, the minimum reference load value for each floor level will be updated and recorded in the gateway device 2.

Compared with the prior art, the elevator monitoring system according to the present disclosure detects whether there is a passenger inside the elevator car by learning actual load value condition in a no-load state (that is, the determination of the minimum reference load value corresponding to the information about the current floor level), eliminating influences of other components on the load value output, and ensuring robustness of the system.

The elevator monitoring system according to the present disclosure can continuously monitor changes in load conditions in real time, and even when the structure of the elevator car or elevator conditions change, the no-load condition (i.e., the minimum reference load value) can be updated quickly to reflect the actual no-load output.

According to the above embodiments of the present disclosure, the gateway device 2 is arranged in an elevator machine room (not shown) of the elevator system, and the load weighing device 3 and the elevator controller 4 are arranged on the elevator car (not shown).

According to the above embodiments of the present disclosure, the gateway device 2 uses wireless communication transmission technology (for example, 3G, 4G, and 5G) to send the warning alarm indicating a passenger is entrapped in the elevator car to the remote server and notify maintenance personnel.

According to the above embodiments of the present disclosure, based on the fault information and the status information, if the gateway device 2 determines that the elevator car is not within the door zone of the current floor level, the current load value is compared with the minimum reference load values corresponding to two adjacent stopping floor levels respectively, and if the current load value is greater than both of the minimum reference load values corresponding to the two adjacent stopping floor levels, the gateway device 2 will send the warning alarm indicating a passenger is entrapped in the elevator car to the remote server.

For example, when the target stopping floor level of the elevator car is the third floor, after the gateway device 2 determines that the elevator has failed, if the gateway device 2 continues to determine that the elevator car is not within the door zone of the third floor, the gateway device will compare the current load value respectively with the minimum reference load values corresponding to two adjacent stopping floor levels, namely the second and third floors (in the case of stopping between the second and third floors), or the third and fourth floors (in the case of stopping between the third and fourth floors), and if the current load value is greater than both of the minimum reference load values corresponding to the two adjacent stopping floor levels, the gateway device 2 will send the warning alarm indicating that a passenger is entrapped in the elevator car to the remote server.

According to the above embodiments of the present disclosure, based on the fault information and the status information, if the gateway device 2 determines that the elevator car is within the door area of the current floor level, the current load value is compared with the minimum reference load value corresponding to the this floor level, and if the current load value is greater than the minimum reference load value corresponding to this floor level, the gateway device 2 will send the warning alarm indicating a passenger is entrapped in the elevator car to the remote server.

For example, when the target stopping floor level of the elevator car is the third floor, after the gateway device 2 determines that the elevator has failed (for example when the elevator car is at the third floor, and the door of the elevator car is not open or not completely open), if the gateway device 2 continues to determine that the elevator car is within the door zone of the third floor, the gateway device will compare the current load value with the minimum reference load value corresponding to the this floor level (namely the third floor), and if the current load value is greater than the minimum reference load value corresponding to this floor level, the gateway device 2 will send the warning alarm indicating a passenger is entrapped in the elevator car to the remote server.

With reference to specific embodiments, although the present disclosure has been described in the description and drawings, it should be understood that, without departing from the scope of the present disclosure defined in the claims, those skilled in the art can make various modifications and various equivalents can replace many of the elements described above. Moreover, the combination and collocation of technical features, elements, and/or functions among the specific embodiments in this document are clear and therefore, based on the disclosed content, those skilled in the art can understand that the technical features, elements, and/or functions of an embodiment can be combined into another specific embodiment as appropriate, unless they are otherwise described in the latter. In addition, according to the teachings of the present disclosure, many changes can be made to adapt to special circumstances or materials without departing from the scope of the essence of the present disclosure. Therefore, the present disclosure is not limited to the individual specific embodiments illustrated in the drawings, and the specific embodiments described above are those of the best embodiments currently envisaged for implementing the present disclosure, and the present disclosure is intended to cover all embodiments falling within the scope of the above description and of the appended claims.

What is claimed is:

1. An elevator monitoring system, including a gateway device, a load weighing device and an elevator controller; wherein:

the elevator controller is configured to collect status information of an elevator car and fault information when the elevator car fails;

the gateway device is configured to obtain the fault information and the status information from the elevator controller;

the load weighing device monitors a current load value of the elevator car in real time and transmits the current load value to the gateway device;

the gateway device calculates a minimum reference load value corresponding to each stopping floor level of the elevator car based on the obtained current load value, and updates and records the minimum reference load value in the gateway device in real time; and based on the fault information and the status information, if the gateway device determines that the current load value is greater than the minimum reference load value, the gateway device will send a warning alarm indicating a passenger is entrapped in the elevator car to a remote server.

2. The elevator monitoring system according to claim 1, wherein:

the status information includes information about a floor level where the elevator car is stopped, information about door zone status of the floor level where the elevator car is stopped, information about a speed of the elevator car, and information about opening and closing of the door of the elevator car; and the status information also includes information about current service mode, which includes a fire protection mode, and a maintenance mode in which a warning alarm will not be issued.

3. The elevator monitoring system according to claim 2, wherein:

the gateway device is configured to obtain the information about the floor level, the information about the door zone status of the floor level, the information about the speed of the elevator car and the information about the opening and closing of the door of the elevator car from the elevator controller.

4. The elevator monitoring system according to claim 3, wherein:

based on the current load value, the information about the door zone status of the floor level and the information about the speed of the elevator car, if the gateway device determines that the current load value is between a minimum safety threshold of the elevator and a maximum safety threshold of the elevator, and the elevator car is within the door zone of the current floor level and the information about the speed is zero, the gateway device records the information about the current floor level therein.

5. The elevator monitoring system according to claim 4, wherein:

after the gateway device records the information about the current floor level therein, if the gateway device determines again that the current load value is still between the minimum safety threshold of the elevator and the maximum safety threshold of the elevator, and the elevator car is still within the door zone of the current floor level and the information about the speed of the elevator car is still zero, and furthermore, if the information about the floor level obtained for successive two times is the same, the gateway device records the current load value corresponding to the information about the current floor level therein.

6. The elevator monitoring system according to claim 5, wherein:

if the gateway device determines that the recorded current load value corresponding to the information about the current floor level is obtained for the first time, the gateway device uses the current load value as the minimum reference load value corresponding to the information about the current floor level.

7. The elevator monitoring system according to claim 6, wherein:

if the gateway device determines that the recorded current load value corresponding to the information about the current floor level is not obtained for the first time, the gateway device continues to determine whether the current load value is less than the minimum reference load value corresponding to the information about the current floor level;

and if the current load value is less than the minimum reference load value corresponding to the information about the current floor level, the gateway device updates and records the current load value as the minimum reference load value corresponding to the information about the current floor level therein;

and if the current load value is greater than the minimum reference load value corresponding to the information about the current floor level, the minimum reference load value corresponding to the information about the current floor level will not be replaced by the current load value.

8. The elevator monitoring system according to claim 2, wherein:

based on the fault information and the status information, if the gateway device determines that the elevator car is not within the door zone of the current floor level, the current load value is compared with the minimum reference load values corresponding to two adjacent stopping floor levels respectively, and if the current load value is greater than both of the minimum reference load values corresponding to the two adjacent stopping floor levels, the gateway device will send the warning alarm indicating a passenger is entrapped in the elevator car to the remote server.

9. The elevator monitoring system according to claim 2, wherein:

based on the fault information and the status information, if the gateway device determines that the elevator car is within the door area of the current floor level, the current load value is compared with the the minimum reference load value corresponding to the current floor level, and if the current load value is greater than the minimum reference load value corresponding to the current floor level, the gateway device will send the warning alarm indicating a passenger is entrapped in the elevator car to the remote server.

10. The elevator monitoring system according to claim 1, wherein:

the gateway device is arranged in an elevator machine room of the elevator system, and the load weighing device and the elevator controller are arranged on the elevator car.

11. The elevator monitoring system according to claim 1, wherein:

the gateway device uses wireless communication to transmit to the remote server the warning alarm indicating that the passenger is entrapped in the elevator car.

* * * * *